United States Patent Office 3,449,289
Patented June 10, 1969

3,449,289
HEAT-CURABLE AMINO-ORGANOSILICON COMPOSITIONS AND THE CURED ELASTOMERS DERIVED THEREFROM
Richard L. Schank, Tonawanda, and Thomas C. Williams, Lancaster, N.Y., assignors to Union Carbide Corporation, a corporation of New York
No Drawing. Filed June 17, 1966, Ser. No. 558,257
Int. Cl. C08g 31/24, 47/06
U.S. Cl. 260—37                                      11 Claims

ABSTRACT OF THE DISCLOSURE

Heat-curable amino-organosiloxane compositions comprising (1) an amino-organopolysiloxane gum; (2) a blocked isocyanate curing agent; (3) a filler; and (4) a hydroxy end-blocked organopolysiloxane fluid; as well as the cured siloxane elastomers derived from said compositions and a composite article comprising a substrate having said cured siloxane elastomers directly bonded to the surface thereof.

---

This invention relates to novel organopolysiloxane formulations suitable for curing to organopolysiloxane elastomers, to a process for preparing said organopolysiloxane elastomers, and to the elastomers prepared from said organopolysiloxane formulations.

Silicone elastomers based on diorganopolysiloxane polymers are well-known products and are presently enjoying an expanding market in the field of synthetic elastomers, due in part to the unusual physical properties which are obtained with these materials, physical properties which are not readily obtainable with other types of elastomers.

To date two general methods have been employed in curing silicone elastomers, the first of which involves the incorporation of a curing agent into a composition containing a polysiloxane gum and, if desired, other additional ingredients; and then activating the curing agent through the application of heat. In the second method, the elastomers are cured at room temperature through the interaction of the various ingredients. The elastomers prepared according to the first method discussed above (i.e. those prepared by incorporating a curing agent and subsequently applying heat) are usually referred to as heat-cured or thermosetting elastomers. Those prepared by the second method are usually referred to as room temperature vulcanizable or RTV elastomers.

The bulk of the commercially important silicone rubbers are of the thermosetting type. They are usually produced by heat treating compositions containing all of the various ingredients including the curing catalyst, compositions which are in the form of a plastic dough or a viscous solution in a volatile solvent. After the doughs or solutions containing the various essential ingredients have been prepared, they ideally should be able to be stored for an extended period of time at normal temperatures without any changes occurring in the physical properties or characteristics of either the uncured mixtures or the elastomers perpared therefrom.

Although there have been a number of various types of compounds suggested in the prior art as being suitable for use as curing catalysts for thermosetting or heat-curable compositions, such as sulfur compounds similar to those used in organic rubbers, most of the commercially significant thermosetting or heat-curable compositions which are presently being utilized employ organic peroxides as curing agents. Whereas the compositions employing other types of compounds such as the sulfur compounds for curing agents result in elastomers having highly undesirable characteristics (for example, sulfur-cured materials are susceptible to oxidation at elevated temperatures and are hydrolytically unstable in the presence of moisture), the organic peroxide-cured compositions have been found to be in many instances highly versatile and practical to use. However, even though the organic peroxide-cured elastomers having many excellent performance characteristics, these compositions also exhibit several important disadvantages and defects, many of which may be attributed either directly or indirectly to the organic peroxide curing agents.

The organic peroxides as a class of compounds are notoriously hazardous materials. They are all highly flammable and in some instances they are shock-sensitive and/or explosive. Thus, great care and caution must always be exercised in their storage, handling and use. In addition, there is only a relatively small number of organic peroxides which are effective as curing catalysts for thermosetting silicone elastomer compositions and which are produced economically in commercial quantities. Thus, the scope in the choice of at least one of the components in a peroxide cured composition is somewhat limited.

Some of the peroxides which are suitable for use as curing agents for heat-curable elastomer compositions, such as ditertiary-butyl peroxide, are highly volatile under ordinary storage conditions, and compositions containing these compounds rapidly lose their ability to be subsequently heat-cured unless they are stored in a hermetically sealed condition. Some of the other peroxides which are suitable for use as curing agents in heat-curable compositions and which are solid under ordinary storage conditions, such as benzoyl peroxide, have a tendency to migrate and re-crystallize into large crystals after having been dispersed into the organopolysiloxane composition. This migration and re-crystallization of curing catalysts results in unsightly surface blooms in the compositions prior to cure, and in internal voids in the resulting elastomer after the compositions have been cured. Some of the other useful peroxide curing catalysts undergo a continual slow decomposition, even under hermetically sealed conditions, and hence compositions containing these peroxides suffer a continual loss of curing agent and curing capability with time.

Many of these effective peroxide curing catalysts, such as benzoyl peroxide and 2,4-dichlorobenzoyl peroxide, are also sufficiently unstable at temperatures encountered in normal storage and during pre-processing of the composition prior to cure as to cause premature reaction of the various components in the curable composition. This premature reaction of the various components results in changes in the physical properties of both the uncured compositions and the resulting elastomers after the compositions are cured. This tendency to prematurely react at only moderate temperatures results in a low margin of processsing safety during fabrication operations, since extensive premature reaction in the uncured compositions will make these compositions unfit for further use.

Another disadvantage which is often encountered when organic peroxides are employed as curing catalysts for organopolysiloxane elastomers is oxygen inhibition during cure. Organopolysiloxane compositions containing organic peroxide curing catalysts are highly susceptible to inhibition by molecular oxygen during curing, especially in curing processes where contact occurs between the composition being cured and the normal atmosphere or other molecular oxygen bearing media. This is a particularly serious problem in hot air curing of thin films which have a high surface-volume ratio. To override oxygen inhibition in a composition which is to be cured in the presence of air or oxygen bearing media, excessive amounts of peroxide must be used, which in turn produce lower physical properties, porosity, odors, and discoloration in the cured product.

Finally, the presence of organic peroxides in organopolysiloxane compositions prohibits the use of some of the ancillary components which might otherwise be useful in modifying the physical properties of the elastomer because these components either react with the organic peroxide, or inhibit or prevent the curing action of the peroxide. For example, materials such as amine and phosphine type antioxidants, asphaltic and bituminous substances, ligneous and pyroligneous substances, and substances containing free sulfur or organic sulfur groups cannot be used effectively in peroxide-containing compositions.

It is an object of this invention to provide novel organopolysiloxane compositions which are curable to elastomers.

It is a further object of this invention to provide heat-curable organopolysiloxane compositions which comprise a curing catalyst other than an organic peroxide curing catalyst.

Other objects of this invention are disclosed in or will be apparent from this disclosure, including the appended claims.

This invention provides an organopolysiloxane composition which is heat-curable to an elastomer and which comprises (A) an organopolysiloxane copolymer containing an average of at least 2 silicon-bonded groups represented by the formula —R$^1$NZ$_2$ and consisting essentially of units of the formula:

and units of the formula:

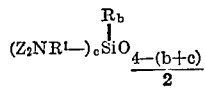

wherein R is a monovalent hydrocarbon radical or a substituted monovalent hydrocarbon radical wherein the substituents are selected from the class consisting of fluoro substituents, cyano groups, alkoxy groups, polyoxyalkylene-substituted alkoxy groups, carbalkoxy groups and nitro groups; R$^1$ is a divalent hydrocarbon group having at least three carbon atoms separating the [—NZ$_2$] group from silicon; Z is hydrogen, a group represented by R as hereinbefore defined, or an amino substituted monovalent hydrocarbon group, at least one of the amino nitrogen atoms present in the group represented by the formula —R$^1$NZ$_2$ having a hydrogen atom attached thereto; $a$ is 1, 2 or 3 and has an average value of from about 1.8 to about 2.2; $c$ is 1, 2, or 3, $b$ is 0, 1 or 2; and the sum of $(b+c)$ is never greater than 3 and has an average value of from about 1.8 to about 2.2; and (B) the reaction product of an organic polyisocyanate and a compound containing a single alcoholic, phenolic, silanic or oximyl hydroxyl group or thiol group as a curing agent.

As hereinbefore indicated, the organopolysiloxane copolymers which are employed in the heat-curable compositions of this invention contain an average of at least 2 silicon-bonded —R$^1$NZ$_2$ groups per molecule and consist essentially of units of the formula:

and units of the formula:

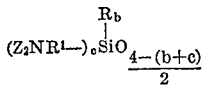

wherein R, R$^1$, Z, $a$, $b$, $c$ and the sum of $(b+c)$ are as herein before defined. As is obvious from the definitions of $a$ and the sum of $(b+c)$ above, these organopolysiloxane copolymers are composed primarily of disubstituted siloxane units, but these copolymers may also contain minor amounts of monosubstituted siloxy units, such as RSiO$_{1.5}$ and Z$_2$NR$^1$SiO$_{1.5}$, and trisubstituted siloxy units, such as R$_3$SiO$_{0.5}$

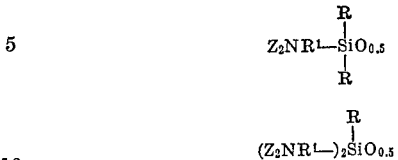

and (Z$_2$NR$^1$—)$_3$SiO$_{0.5}$. Minor amounts of other groups, attached silicon, such as hydroxyl groups, —OR groups, —NH$_2$ groups, —NHR groups, —NR$_2$ groups and

groups wherein R is as hereinbefore defined may also be present in said organopolysiloxane copolymers, and when such groups are present in these copolymers they are usually present as endblocking groups or terminal groups of the polymer chain. Copolymers containing an average of from about one —R$^1$NZ$_2$ group per 3500 silicon atoms to about one —R$^1$NZ$_2$ group per 100 silicon atoms are preferred, and those containing an average of from about one —R$^1$NZ$_2$ group per 900 silicon atoms to about one —R$^1$NZ$_2$ group per 200 silicon atoms are particularly preferred. Copolymer having a viscosity at room temperature of from about 100,000 centipoises to about 10 million centipoises are preferred, and those having a viscosity at room temperature of from about 1 million centipoises to about 3 million centipoises are particularly preferred.

Illustrative of the types of monovalent hydrocarbon groups and substituted monovalent hydrocarbon groups represented by R and Z in the above-mentioned formulae are alkyl groups, such as methyl, ethyl, propyl, n-butyl, t-butyl, n-octyl, n-octadecyl, and the like; aryl groups, such as phenyl, 1-naphthyl, and the like; cycloalkyl groups, such as cyclobutyl, cyclohexyl, cycloheptyl and the like; alkaryl groups, such as p-tolyl, ethylphenyl, xylyl and the like; aralkyl groups, such as benzyl, 2-phenylethyl and the like; olefinically unsaturated hydrocarbon groups, such as vinyl, allyl, 3-butenyl, 3-cyclohexenyl, ethynyl, propynyl, 3-vinylphenyl, and the like; substituted alkyl groups such as 2-cyanoethyl, 3-cyanopropyl, 3-methoxypropyl, 2-ethoxyethyl, 2-phenoxyethyl, 3-carbethoxypropyl, 3,3,3-trifluoropropyl and the like; substituted aryl groups such as p-phenoxyphenyl, 3-nitrophenyl, 4-cyanophenyl and the like; and substituted alkaryl groups such as 3-trifluoromethylphenyl and the like.

As hereinbefore indicated, Z may also represent an amino-substituted monovalent hydrocarbon group, as long as at least one of the amino nitrogen atoms present in the group represented by the formula —R$^1$NZ$_2$ has a hydrogen atom attached thereto. Thus, Z may also represent an aminoalkyl group, such as beta-aminoethyl, gamma-aminopropyl, delta-aminobutyl, N-methyl beta-aminoethyl, N,N dimethyl-gamma-aminopropyl, and the like; or an aminoaryl group, such as m-aminophenyl, N-methyl-m-aminophenyl, N,N dimethyl-m-aminophenyl, and the like.

As is obvious from the definition of Z set forth above, the group represented by the formula —R$^1$NZ$_2$ can be a primary or a secondary aminohydrocarbyl group, such as a primary or secondary aminoalkyl group, aminoalkaryl group, aminoaryl group, aminoaralkyl group, and the like; and when one or both of the groups represented by Z are amino-substituted hydrocarbon groups, the nitrogen atom attached to silicon through the divalent hydrocarbon group represented by R$^1$ can also be a tertiary amino nitrogen if at least one of the amino-substituted monovalent hydrocarbon groups represented by Z contains a primary or a secondary amino group, thereby providing at least one amino nitrogen atom having a hydrogen atom attached thereto. Organopolysiloxane copolymers containing aminoalkyl groups attached to silicon, such as a gamma-aminopropyl and delta-aminobutyl groups; or aminoaryl groups attached to silicon, such as m-aminophenyl groups, are preferred.

Illustrative of the types of divalent hydrocarbon groups represented by $R^1$ in the formulae set forth above are groups such as trimethylene (—$CH_2CH_2CH_2$—), tetramethylene (—$CH_2CH_2CH_2CH_2$—), 1-methyltrimethylene

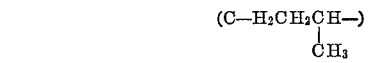

2-ethyltetramethylene

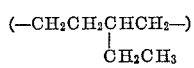

3-cyclohexylene

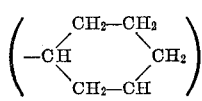

m-phenylene

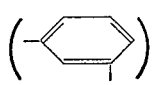

p-phenylene

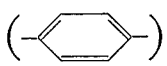

5-naphthylene

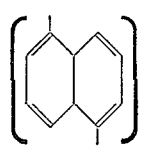

and the like.

The copolymers which are useful in this invention are readily formed by base catalyzed rearrangement reactions which are well known in the art. For example, a cyclic diorgano-substituted siloxane or a mixture of such cyclics can be reacted with an aminohydrocarbyl-substituted cyclic siloxane in the presence of a basic catalyst such as potassium dimethylsilanolate to obtain an aminohydrocarbyl-substituted copolymer of the type employed in this invention.

As hereinbefore indicated, the curing agents which are useful in this invention are the reaction products of an organic polyisocyanate and a compound containing a single alcoholic, phenolic, silanic or oxinyl hydroxyl group or thiol group. Particularly useful as curing agents are are those compounds which contain two or more monourethane or monothiourethane groups per molecule and which have the general formula:

$$R^2(Q)_n$$

wherein $R^2$ is an n-valent organic radical, $n$ has a value of at least 2, and Q is selected from the class consisting of

and

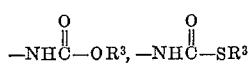

groups wherein $R^3$ is an organosilyl group, an organosiloxyl group or a group represented by R, and $R^3$ is a geminally divalent hydrocarbon radical having both valences satisfied by the nitrogen atom of the oximyl (—ON=) residue.

Illustrative of the types of n-valent organic radicals represented by $R^2$ in the formula set forth above are groups such as 2,4-toluylene

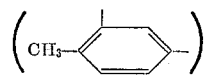

2,6-toluylene

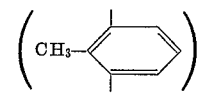

4,4'-diphenylenemethane

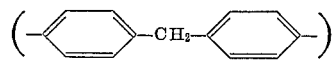

3,3'-dimethyl-4,4'-biphenylene

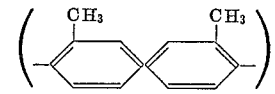

poly(m-methylene-p-tolylene)

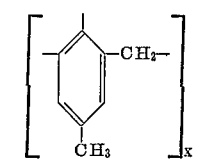

hexamethylene (—$[CH_2]_6$—), bis(ethylene)fumarate

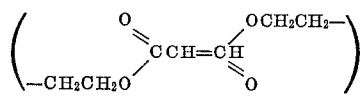

tris(ethylene) trimellitato

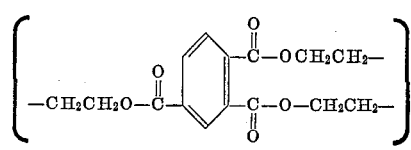

and the like.

The curing agents of this invention are commonly called "blocked isocyanates" and, as hereinbefore indicated, are the reaction products of organic polyisocyanates with compounds bearing single alcoholic, phenolic, silanic or oximyl hydroxyl or thiol groups. Illustrative of the organic polyisocyanates which are useful in preparing the curing agents employed in this invention are isocyanates such as toluene-2,4-diisocyanate

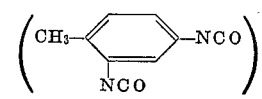

toluene-2,6-diisocyanate

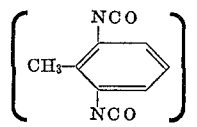

4,4'-diisocyanato-diphenylmethane

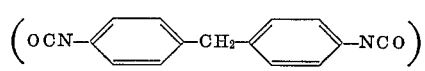

4,4'-diisocyanato-3,3'-dimethylbiphenyl

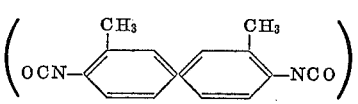

poly(m-methylene-p-isocyanatotoluene)

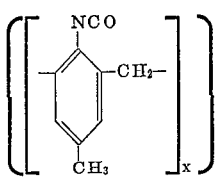

hexamethylene diisocyanate (OCN—(CH$_2$)$_6$—NCO), bis(2-isocyanato ethyl)-fumarate

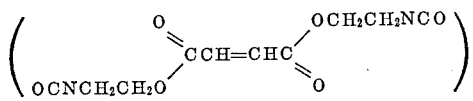

tris(2-isocyanatoethyl)trimellitate

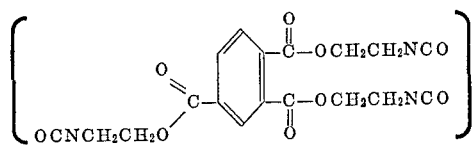

and the like.

Illustrative of the hydroxyl or thiol compounds which are useful as "blocking agents" in preparing the curing agents employed in this invention are alcohols, such as ethanol, n-propanol, n-butanol, isobutanol, 2-ethylhexanol, and the like; phenols, such as phenol, the nitrophenols, the dinitrophenols, the cyanophenols, the naphthols, p-phenyl phenol, and the like; silanols, such as trimethylsilanol, triethylsilanol, ethyldimethylsilanol, phenyldimethylsilanol, hydroxypentamethyldisiloxane, 1-hydroxyheptamethyltrisiloxane and the like; oximes such as acetoxime, methyl ethyl ketoxime, diethyl ketoxime, cyclohexanone oxime, phenyl methyl ketoxime, propionaldoxime, butyraldoxime, benzaldoxime, and the like, and thiols, such as lauryl mercaptan, octadecyl mercaptan, thiophenol, thiocresol, mercaptobenzothiazole, thionaphthol, and the like.

The curing agents employed in this invention are readily prepared by simply mixing together the blocking agent and polyisocyanate and, if necessary, warming the mixture gently for a short period of time. If desired, a mutual solvent for the blocking agent and the polyisocyanate may also be employed. To avoid the presence of any free isocyanate groups in the product, it is advisable to employ a slight excess of the blocking agent.

A particularly convenient method of preparing a curing agent for this invention is to prepare separate solutions of polyisocyanate and blocking agent in a solvent in which the resulting curing agent product is insoluble, such as ligroin or ethyl ether. Upon mixing the separate solutions (and warming, if necessary), the product will precipitate as a fine powder, which can easily be recovered, for example, by filtration and drying.

Although the choice of curing agent is not narrowly critical with respect to the properties of the cured rubber, the choice of curing agent permits the curing conditions to be varied as desired. For example, when the phenol adduct of 4,4'-diisocyanatophenylmethane is employed as a curing agent, a cured elastomer having excellent physical properties is obtained in about 15 to about 30 minutes at a temperature of from about 320° F. to about 340° F., whereas when the acetoxime adduct of toluene diisocyanate is employed as a curing agent, a cured elastomer is readily obtained within minutes at temperatures of from about 150° F. to about 180° F.

The amount of curing agent which is employed in compositions of this invention depends primarily on the functionality of the curing agent, the concentration of aminoorgano substituents present in the organopolysiloxane copolymer, and the desired degree of cross-linking desired in the cured elastomeric product. A stoichiometric excess of from about 1.1 to about 2.0 urethane or thiourethane groups in the curing agent per aminoorgano substituent in the organopolysiloxane copolymer is preferred. Generally, the amount of curing agent will range from about 0.01 part to about 10 parts by weight per 100 parts by weight of copolymer, with about 0.2 part to about 3.0 parts by weight per 100 parts by weight of copolymer being preferred.

In addition to the above-mentioned components, the compositions of this invention may also contain additional components such as filler materials, coloring agents, plasticizers, softeners, odorants, thermal stabilizers, bonding additives, anti-oxidants, and the like.

The fillers which may be employed in preparing the improved organopolysiloxane formulations and elastomers of this invention include the filler materials customarily employed in organopolysiloxane elastomers, such as the highly reinforcing carbon black and inorganic compounds; and they also include materials which could not heretofore be effectively employed in heat-curable peroxide-containing compositions, materials such as asphaltic and bituminous fillers, lignious pulps and powders, pyroligneous tars, petroleum cracking residues, and the like. If desired, the filler materials can also be treated with modifying agents, such as the hydrolyzable hydrocarbon silanes or siloxanes, to improve their surface characteristics.

When inorganic fillers are employed in preparing the improved formulations and elastomers of this invention, it is preferred that such fillers be finely-divided, silica-base materials having a particle diameter of less than 500 millimicrons and a surface area of greater than 50 square meters per gram. However, inorganic filler materials having a composition, or particle diameter and surface area, other than those preferred can also be employed, either alone or in combination with the preferred fillers. Thus, such filler materials as titania, iron oxide, aluminum oxide, aluminum silicate, zinc oxide, zirconium silicate, diatomaceous earth, calcium carbonate and quartz can be employed either alone or in combination with the finely-divided, silica-base fillers described above.

The amount of highly-reinforcing silica employed as filler in preparing the improved formulations and elastomers of this invention depends upon the tensile strength and hardness properties desired in the elastomer. By way of illustration, where high tensile strength and high hardness properties are required, large amounts of highly-reinforcing silica are employed, together with smaller amounts of other type fillers, if such be desired. Where high tensile strength and high hardness properties are not as important, for example, when the elastomers are to be employed as coatings or cable compounds, less amounts of highly reinforcing silica can be employed together with larger amounts of other types of fillers.

When highly-reinforcing silica-fillers are employed as filler materials in the compositions of this invention, it is preferred that a hydroxyl end-blocked organopolysiloxane fluid such as a hydroxyl end-blocked dimethylsiloxane fluid also be included in the composition to inhibit crepe-hardening and facilitate the incorporation of the silica filler materials in said compositions. Hydroxy end-blocked organopolysiloxane fluids having an average molecular weight of from about 200 to about 2,000 are preferred. Although the amount of hydroxyl endblocked organopolysiloxane fluid which is incorporated into the compositions of this invention is not narrowly critical, this amount is somewhat dependent on the molecular weight of the hydroxyl end-blocked fluid which is employed, the type and amount of filler which is used, and the structure and concentration of aminohydrocarbyl or substituted aminohydrocarbyl groups present in the copolymeric gum which is employed.

Any suitable means may be used for mixing together the various components employed in preparing the composition of this invention, such as rubber mills or internal rotary blade mixers like Banbury mixers. Mixing may also be accomplished by dissolving or suspending the various components in suitable liquid solvents and combining the resultant solutions or slurries by simply stirring said solutions or slurries together and then removing the solvents from the mixture. The sequence in which the components are combined is not critical, and has only very slight effects on the properties of the compositions which are obtained, both before and after conversion of these compositions to elastomers. A typical method of preparing the compositions of this invention is one wherein the organopolysiloxane copolymer is placed on a rubber mill or in an internal mixer such as a Banbury mixer, and the copolymer mass is then agitated while any ancillary ingredients which are to be employed such as fillers, pigments, lubricants, and the like are incorporated into the mass as desired. The blocked isocyanate curing agent is customarily but not necessarily added last. The resulting plastic mass may then be stored for an indefinite period of time prior to use, it may immediately be shaped by extrusion, calendering, molding and the like; or it may be dissolved in a suitable solvent; applied to a substrate material, and the solvent removed to form a coating on said substrate material.

The compositions of this invention are converted to elastomers by heating these compositions to a curing temperature and maintaining said compositions at this temperature for a period of time sufficient to convert the composition to an elastic, insoluble elastomer. The ranges of curing temperatures and the periods of time necessary to effectively cure the compositions of this invention are not narrowly critical; and, as hereinbefore indicated, these ranges are somewhat dependent on the specific curing agent which is employed. Temperatures of from about 140° F. to about 400° F. for a period of from about 5 hours to 1 minute are sufficient to cure the compositions of this invention to elastomers. Temperatures of from about 150° F. to about 350° F. over a period of time of from about 1 hour to about 5 minutes are preferred.

The compositions of this invention can be cured by heating said compositions in a mold, by subjecting them to air, steam or other gaseous media which are hot enough to effect a cure of said compositions, or by immersing said compositions in a bath of a molten metal, salt or other liquid which is inert toward the composition and which is at a temperature sufficient to effect a cure. After the composition has been cured, it is often desirable to subject the resulting elastomer to a postcure treatment at elevated temperatures to stabilize the physical properties of the elastomer, and in the case of those elastomers which have been mold-cured, to remove any volatile components which may have remained in the composition through the mold-curing step. The postcuring treatment can be conducted by heating the resulting elastomer in an oven such as a forced draft air oven at temperatures of from about 200° F. to about 300° F. for a period of time of from about 5 hours to about 30 minutes.

The preferred compositions of this invention are free of any components which are readily combustible, shock sensitive or explosive such as peroxide curing agents used in the curable compositions of the prior arts; and they may be subjected to ordinary storage conditions indefinitely in open air without loss of their ability to be cured. They can be prepared, stored and fabricated at temperatures of up to 50° C. and above and remain free from premature curing or scorching, and they may also incorporate ancillary components which are antagonistic toward curing agents utilized in the prior art. The compositions of this invention also may be cured in air or in other molecular oxygen containing atmospheres without oxygen inhibition of curing process occurring, and without porosity and discoloration of the cured product taking place.

In addition to the advantages set forth above it unexpectedly has been found that the compositions of this invention will bond uniformly and directly to a wide variety of substrate materials in the absence of a bonding agent. Most heat-cured silicone elastomers are noted for their lack of adhesion to other materials; and while this general lack of adhesion has been valuable and useful in many applications, there are many instances, such as in the fabrication of composite articles comprising these elastomers, where the adhesion of a heat-cured silicone elastomer to another material is essential. In most instances the establishment of firm and permanent bonds between thermosetting silicone elastomer compositions and other materials has only been able to be achieved through the use of one or more intermediate coatings known variously as primers, tie-coats, cements, interlayers, adhesives, and the like. These intermediate coatings usually are applied prior to curing either to the silicone elastomer, to the substrate material, or to both; and this requirement for an intermediate coating has led to a multitude of intermediate coatings, application methods and bonding procedures, and has resulted in a complex, bothersome and somewhat inefficient technology. When the compositions of this invention are employed in similar applications, there is no need for special primers or complicated bonding procedures, the only requirement being that the surfaces to be joined are clean and in firm contact with the composition during the curing process.

The organopolysiloxane elastomers produced in accordance with this invention can be employed in any of the conventional known uses for organopolysiloxane elastomers, including their use as thermal and electrical insulators, gaskets, seals, vibration dampings, coatings, molded elastomer products, and the like.

The following examples are illustrative of the manner of preparing compositions in accordance with this invention. The terms and expressions employed in the examples and throughout this specification are to be interpreted as indicated in the glossary which immediately precedes the examples.

In the examples all proportions are in parts by weight unless specifically stated otherwise.

GLOSSARY (A) Elongation (ASTM D–412–51T).—The amount of stretch of a sample under a tensile force, expressed as a percentage of the original length.

$$\frac{(\text{Stretched length} - \text{original length})}{\text{original length}} \times 100 = \text{elongation (percent)}$$

(B) Hardness (Shore A) (ASTM D–676–49T).— Degree of indentation produced by a plunger or indentor under a specific load measured with a Shore A durometer. The values range from 0 to a maximum hardness of 100.

(C) Tensile strength (ASTM D–412–49T).—The force necessary to rupture a rubber specimen when stretched to the breaking point, divided by the original cross-sectional area (pounds per square inch).

Example 1

In a glass resin flask equipped with a stirrer, gas inlet and outlet tubes, and a materials addition port were placed 1990.6 grams of octamethylcyclotetrasiloxane, 0.4 gram of dodecamethylpentasiloxane, 9.0 grams of delta-aminobutylmethylcyclosiloxane. This mixture was then heated in an oil bath at 150° C. for 20 minutes while purging with nitrogen gas. Potassium dimethylsilanolate was added to a concentration of 30 parts per million as potassium metal with stirring, and the mass was maintained at 150° C. for five hours. The mixture was then cooled to room temperature under a continual nitrogen purge, and a transparent, colorless, plastic gum product was recovered. This gum product was designated Copolymer C. In a similar mannar, 13 other gum products were prepared, and they are designated as Copolymers A, B, and D through O in the following table. These were also transparent colorless, plastic gum products.

to facilitate dispersion) per 100 parts of Copolymer C were added to the mixture of copolymer, filler and hy-

TABLE I.—ORGANOPOLYSILOXANE COPOLYMER COMPOSITIONS

[Amounts are in parts by weight per 100 parts by weight of the resulting gum]

| Components and conditions | A | B | C | D | E | F | G | H | I | J | K | L | M | N | O |
|---|---|---|---|---|---|---|---|---|---|---|---|---|---|---|---|
| Octamethylcyclotetrasiloxane | 99.55 | 99.64 | 99.5. | 97.80 | 95.80 | 91.80 | 99.65 | 99.09 | 98.70 | 98.60 | 97.00 | 98.65 | 83.65 | 87.65 | 79.65 |
| Dodecamethylpentasiloxane |  | 0.01 | 0.02 |  |  |  |  | 0.01 |  |  |  |  |  |  |  |
| 4-aminobutylmethylcyclosiloxane | 0.25 | 0.35 | 0.45 | 2.00 | 4.00 | 8.00 | 0.25 |  |  |  |  | 0.35 | 0.35 | 0.45 | 0.35 |
| m-Aminophenylheptamethylcyclotetrasiloxane |  |  |  |  |  |  |  | 0.70 | 1.30 | 1.30 | 3.00 |  |  |  |  |
| Octaphenylcyclotetrasiloxane |  |  |  |  |  |  |  |  |  |  |  |  |  | 12.00 |  |
| Ethylmethylcyclosiloxane |  |  |  |  |  |  |  |  |  |  |  | 1.00 | 16.00 |  |  |
| Vinylmethylcyclosiloxane | 0.20 |  |  | 0.20 | 0.20 | 0.20 |  | 0.20 |  | 0.10 |  |  |  |  |  |
| 3-cyanopropylmethylcyclosiloxane |  |  |  |  |  |  |  |  |  |  |  |  |  |  | 20.00 |
| Potassium dimethylsilanolate (p.p.m. K) | 40 | 40 | 30 | 40 | 40 | 40 |  | 40 | 30 | 40 | 40 | 40 | 40 | 75 | 30 |
| Tetramethylammonium dimethylsilanolate (p.p.m. K) |  |  |  |  |  |  | 16 |  |  |  |  |  |  |  |  |
| Polymerization time (hours) | 5.0 | 4.0 | 5.0 | 5.0 | 5.0 | 5.0 | 4.0 | 5.0 | 5.0 | 5.0 | 5.0 | 5.0 | 5.0 | 5.0 | 5.0 |
| Temperature (° C.) | 150 | 150 | 150 | 150 | 150 | 150 | 90 | 150 | 150 | 150 | 150 | 150 | 150 | 150 | 150 |

100 grams of Copolymer A, 30 grams of fumed silica filler, and 15 grams of a hydroxyl-endblocked dimethylsiloxane fluid having an average molecular weight of about 800 and from about 2 to about 3 percent by weight of hydroxyl groups were mixed together on a two roll rubber mixing mill until a homogeneous plastic dough was formed. 0.63 gram of the phenol adduct of methylene bix(4-phenylisocyanate) was added to this mixture and incorporated therein by thorough mixing. The resulting composition was placed between sheets of polytetrafluoroethylene film to prevent adhesion to the mold, and then press cured in a mold for 30 minutes at 340° F. to form a standard ASTM tensile testing sheet. After the sheet had been removed from the mold, it was post cured in a forced draft air oven for two hours at 300° F. to remove any remaining volatile materials. The physical properties of the resulting elastomer were then determined according to the ASTM standard tests hereinbefore described. In a similar manner Copolymers B, C, G, K, L, M and N were also used to prepare compositions which were curable to elastomers. The various components of these compositions and the physical properties of the resulting elastomers are set forth in Table II below.

droxyl end-blocked dimethylsiloxane fluid, and the mixing was continued until the phenol adduct curing agent was thoroughly dispersed therein. The resulting composition was then press cured into slabs at 340° F. for a 30-minute period, followed by a post-cure upon removal of the slabs from the molds for a period of two hours at 300° F. in an air oven. The resulting elastomer had the following physical properties:

| | |
|---|---|
| Hardness (Shore A) | 47 |
| Elongation (percent) | 730 |
| Tensile (p.s.i.) | 1230 |

In a similar manner, 0.57 part of acetoxime blocked toluene diisocyanate (the isocyanate used in preparing the blocked isocyanate curing agent being a 65%–35% mixture of toluene 2,4-diisocyanate and toluene 2,6-diisocyanate) were added to 100 parts of a copolymer having the composition of Copolymer C in Table I above. After the curing agent was thoroughly dispersed in the copolymer, a portion of resulting composition was press cured into slabs at 150° F. for a 30-minute period, and another portion of the resulting composition was press cured into slabs at 175°–180° F. for a period of 15 min-

TABLE II

| Composition | 1 | 2 | 3 | 4 | 5 | 6 | 7 | 8 | 9 | 10 | 11 |
|---|---|---|---|---|---|---|---|---|---|---|---|
| Copolymer Type (100.0 g.) (Table I) | A | B | C | B | B | C | G | K | L | M | N |
| Fillers: | | | | | | | | | | | |
| Fumed silica (g.) | 30 | 30 | 30 |  |  |  | 30 | 30 | 30 | 30 | 30 |
| Ppt. silica (g.) |  |  |  | 30 |  |  |  |  |  |  |  |
| Clay (g.) |  |  |  |  | 80 |  |  |  |  |  |  |
| Carbon Black (g.) |  |  |  |  |  | 90 |  |  |  |  |  |
| Fluid (Hydroxyl terminated dimethylsiloxane fluid) (g.) | 15 | 15 | 15 | 15 | 10 | 30 | 15 | 15 | 15 | 15 | 15 |
| Curing agent: Phenol adduct of methylene bix-(4-phenylisocyanate) | 0.63 | 0.88 | 1.13 | 0.88 | 0.88 | 1.13 | 0.88 | 2.70 | 0.88 | 0.88 | 1.17 |
| Press cure time (min./° F.) | 30/340 | 30/340 | 30/340 | 30/340 | 30/340 | 30/340 | 30/340 | 30/340 | 30/340 | 30/340 | 30/340 |
| Post cure time (hrs./° F.) | 2/300 | 2/300 | 2/300 | 2/300 | 2/300 | 2/300 | 2/300 | 2/300 | 2/300 | 2/300 | 2/300 |
| Physical Properties: | | | | | | | | | | | |
| Hardness (Shore A) (H) | 43 | 42 | 47 | 33 | 61 | 36 | 50 | 52 | 47 | 47 | 50 |
| Elongation (percent) (E) | 970 | 730 | 730 | 650 | 320 | 280 | 520 | 605 | 710 | 840 | 720 |
| Tensile (p.s.i.) (T) | 1,270 | 1,230 | 1,230 | 760 | 325 | 485 | 940 | 1,215 | 1,160 | 1,190 | 1,135 |

Example 2

To illustrate the effect the type of curing agent has on the temperatures and periods of time necessary to achieve a satisfactory cure, two compositions were prepared; one wherein a phenol adduct was employed as a curing agent, and the other wherein an acetoxime adduct was employed. Both compositions used a copolymer having the composition of Copolymer C in Table I above, and the composition wherein a phenol adduct was employed as a curing agent also included 30 parts of a fumed silica filler per 100 parts of gum and 15 parts of a hydroxyl end-blocked dimethylsiloxane fluid having an average molecular weight of about 800 and from about 2 to about 3 percent by weight of hydroxyl groups. 1.13 parts of a phenol adduct of methylene bis(4-phenylisocyanate) (as a 33.3% by weight solution in dimethyl formamide utes. The resulting elastomers had the following physical properties:

150° F. for 30 minutes:

| | |
|---|---|
| Hardness (Shore A) | 26 |
| Elongation (percent) | 905 |
| Tensile (p.s.i.) | 645 |

175°–180° F. for 15 minutes:

| | |
|---|---|
| Hardness (Shore A) | 33 |
| Elongation (percent) | 520 |
| Tensile (p.s.i.) | 745 |

Example 3

To illustrate that the compositions of this invention can be stored under normal storage conditions for an extended period of time and maintain their capability to be subsequently cured to useful elastomers, four samples were prepared and then stored at 50° C. for a period of over two months and then cured to form elastomers. Two samples were prepared from a copolymer having the composition of Copolymer B in Table I and containing 0.89+1.78 parts respectively of the phenol adduct of methylene bis(4-phenylisocyanate) per 100 parts by weight of Copolymer B (1.5 and 3.0 times the theoretical amount necessary to react with the amino groups present in the copolymer). Another two samples were prepared from a copolymer having the composition of Copolymer C in Table I and containing 1.13 and 2.26 parts respectively of the phenol adduct of methylene bis(4-phenylisocyanate) per 100 parts of Copolymer C (1.5 and 3.0 times the theoretical amount necessary to react with the amino groups present in the copolymer). The resulting compositions were stored at 50° C. for a period of over two months with no apparent changes occurring to these compositions other than a normal amount of crepe hardening. The stored samples were then remilled to a plastic state in 30 to 90 seconds indicating that essentially no curing took place during the storage period. After remilling portions of these samples were press cured at 340° F. for a 30-minute period to form strong, resilient elastomers.

Example 4

To illustrate the utility of the compositions of this invention in forming composite articles containing elastomers formed from these compositions, a curable composition containing 100 parts by weight of a copolymeric gum having the composition of Copolymer C in Table I, 20 parts of a fumed silica filler, 10 parts of a hydroxyl endblocked dimethylsiloxane fluid having an average molecular weight of about 800 and from about 2 to about 3 percent by weight of hydroxyl groups, 60 parts of a calcium carbonate filler, and 1 part of a titanium dioxide pigment was prepared by intimately mixing the various components together, and then this composition was solvated in xylene to give a xylene solution of the composition containing 26% by weight of solids. To this solution was added 2 parts of the phenol adduct of methylene bis(4-phenylisocyanate) per 100 parts of gum, and the resulting mixture was used to dip coat a 5" x 12" piece of unprimed nylon cloth. The dip coated nylon cloth sample was desolvated in the atmosphere at room temperature and then cured for 10 minutes at 300° F. in an air oven. The cured elastomer coating exhibited excellent adhesion to the cloth and remained bonded to the cloth after being immersed in a boiling water solution containing 1.5% by weight of sodium hydroxide for a ten minute period.

Another sample of unprimed nylon cloth was dip coated with a xylene solution containing 35% by weight of a heat curable composition of the prior art (a phenyl and vinyl modified dimethylpolysiloxane gum composition containing 33.7 parts by weight per 100 parts by weight of gum of a fume silica filler, 6 parts by weight per 100 parts by weight of gum of a precipitated silica filler, 1 part by weight per 100 parts by weight of gum of barium zirconate, and 10 parts by weight per 100 parts by weight of gum of an ethoxy end-blocked dimethylsiloxane fluid having an average molecular weight of about 725) and 2 parts of benzoyl peroxide per 100 parts of gum, air desolvated at room temperature, and cured for 15 minutes at 300° F. in an air oven. The resulting elastomer coating exhibited poor adhesion to the cloth and failed to adhere to the cloth sample after the sample was immersed in a boiling water solution containing 1.5% by weight of sodium hydroxide for a ten minute period.

Example 5

To further illustrate the ability of the compositions of this invention to bond directly to various substrate materials, a composition containing a copolymeric gum having the composition of Copolymer C in Table I and 1.5 parts per 100 parts of gum of a phenol adduct of methylene bis(4-phenylisocyanate) was applied to a number of substrates without the use of bonding primers. Before the composition was applied to the substrate, the surface of each sample was cleaned of dirt and oil by using a selected solvent such as n-hexane and 1,1,1-trichloro ethane. Bonding was accomplished by heating for 30 minutes at 340 °F. Whenever possible, pressure was also applied to the samples during the curing step to insure intimate contact between the composition being cured and the substrate material. In the cases of non-polished steel, aluminum, cadmium plated steel, silver plated brass, rayon, nylon, Orlon, cotton, melamine-phenolic resin-coated glass, and Mylar film substrates, good adhesion was observed between the elastomer and the substrate material. In the cases of ceramic tile and phenolic-coated paper, fair adhesion was observed.

Example 6

In order to clearly illustrate that the curing mechanism which is involved in curing the compositions of this invention is one in which there is an interaction of the blocked polyisocyanate curing agent and the copolymeric gum, a remilled composition containing a copolymeric gum having the composition of Copolymer C in Table I and 30 parts by weight per 100 parts by weight of gum of a fumed silica filler was placed between sheets of polytetrafluoroethylene film and inserted into a mold for curing. After attempting to cure this composition for 30 minutes at 340° F., the sample was removed from the mold and its physical properties observed. No curing had occurred in the absence of the blocked polyisocyanate curing agent. A similar sample containing only a copolymeric gum having the composition of Copolymer A in Table I and 0.4 part by weight per 100 parts by weight of gum of a phenol adduct of methylene bis(4-phenylisocyanate) was inserted into a mold between sheets of polytetrafluoroethylene film and press cured at a temperature of 320° F. for 30 minutes to obtain a strong resilient elastomer.

Example 7

To illustrate the advantages of the blocked polyisocyanate curing agents over free isocyanates as curing agents, a sample of a copolymeric gum composition containing 99.3 parts by weight of dimethylsiloxy units per 100 parts by weight of gum, 0.5 part by weight of delt-aminobutylmethylsiloxy units per 100 parts by weight of gum, and 0.2 part by weight of methylvinylsiloxyl units per 100 parts by weight of gum was remilled to a plastic state and then pressed to a film 20 mils thick. This film cured to a rubber within five minutes after being inserted into a bath of toluene diisocyanate at room temperature. In contrast, a composition containing 100 grams of a copolymeric gum having the composition of Copolymer C in Table I, 30 grams of a fume silica filler, and 15 grams of a hydroxyl end-blocked dimethylsiloxane fluid having an average molecular weight of about 800 and from about 2 to about 3 percent by weight of hydroxyl groups was milled together with 0.72 gram of a phenoxy blocked toluene diisocyanate curing agent. No reaction occurred at room temperature. After heating this composition in a mold for 30 minutes at 340° F. and post-curing the resulting elastomer for 2 hours at 300° F., an elastomer having the following physical properties was obtained:

Hardness (Shore A) _____ 35
Elongation (percent) _____ 725
Tensile (p.s.i.) _____ 1070

Thus, compositions containing free isocyanates are reactive at room temperature and have a relatively short handling time after the composition has been exposed

What is claimed is:
1. A composition which is heat-curable to an elastomer which comprises:
 (A) an organopolysiloxane copolymer gum having a viscosity at room temperature of from about 100,000 centipoises to about 10 million centipoises and containing an average of at least 2 silicon-bonded —R¹NZ₂ groups per molecule and consisting essentially of the formula

$$R_aSiO_{\frac{4-a}{2}}$$

and units of the formula:

$$(Z_2NR^1-)_cSiO_{\frac{4-(b+c)}{2}}^{R_b}$$

wherein R is a monovalent hydrocarbon radical or a substituted monovalent hydrocarbon radical wherein the substituents are selected from the class consisting of fluoro substituents, cyano groups, alkoxy groups, polyoxyalkylene-substituted alkoxy groups, carbalkoxy groups and nitro groups, R¹ is a divalent hydrocarbon group having at least three carbon atoms separating the —NZ₂ group from silicon, Z is hydrogen, a group represented by R as hereinbefore defined, or an amino-substituted monovalent hydrocarbon group, at least one amino nitrogen atom present in the group represented by the formula —R¹NZ₂ having a hydrogen atom attached thereto; $a$ is 1, 2 or 3 and has an average value of from about 1.8 to about 2.2, $c$ is 1, 2 or 3, $b$ is 0, 1 or 2, and the sum of $(b+c)$ is never greater than 3 and has an average value of from about 1.8 to about 2.2, and
 (B) as a curing agent, the reaction product of an organic polyisocyanate and a compound containing a single alcoholic, phenolic, silanic or oximyl hydroxyl group or thiol group; and
 (C) a filler, and
 (D) a hydroxyl end-blocked organopolysiloxane fluid having an average molecular weight of from about 200 to about 2,000.

2. A composition as defined in claim 1, wherein the organopolysiloxane copolymer gum contains an average of from about one —R¹NZ₂ group per 900 silicon atoms in said copolymer to about one —R¹NZ₂ group per 200 silicon atoms in said copolymer, and wherein the curing agent is a compound having the formula:

wherein R² is an n-valent organic radical, $n$ has a value of at least 2, and Q is selected from the class consisting of $$-NH\overset{O}{\overset{\|}{C}}-OR^3, -NH\overset{O}{\overset{\|}{C}}-SR^3$$

and $$NH\overset{O}{\overset{\|}{C}}-ON=R^4$$

groups wherein R³ is an organosilyl group, an organosiloxyl group or a group represented by R, and R⁴ is a geminally divalent hydrocarbon radical having both valences satisfied by the nitrogen atom of the oximyl (—ON=) residue.

3. A composition as defined in claim 2, wherein the amount of curing agent present ranges from about 0.2 part to about 3.0 parts by weight of curing agent per 100 parts of organopolysiloxane copolymer gum and wherein the hydroxyl end-blocked organopolysiloxane fluid is a hydroxyl end-blocked dimethylsiloxane fluid.

4. A composition as defined in claim 3 wherein R is selected from the class consisting of methyl, ethyl, vinyl and 3-cyanopropyl groups, R¹ is selected from the class consisting of butylene and m-phenylene, Z is hydrogen, R² is selected from the class consisting of 4,4'-diphenylenemethane and tolylene and Q is selected from the class consisting of $$-NH\overset{O}{\overset{\|}{C}}-OR^3$$

groups and $$-NH\overset{O}{\overset{\|}{C}}-ON=R^4$$

groups wherein R³ is phenyl and R⁴ is dimethylmethylene.

5. A composition as defined in claim 4, wherein the filler is selected from the class consisting of fumed silica, precipitated silica, carbon black, clay, and a mixture of fumed silica and calcium carbonate.

6. A cured organopolysiloxane elastomer derived from curing the composition as defined in claim 1.

7. A cured organopolysiloxane elastomer derived from curing the composition as defined in claim 2.

8. A cured organopolysiloxane elastomer derived from curing the composition as defined in claim 3.

9. A cured organopolysiloxane elastomer derived from curing the composition as defined in claim 4.

10. A cured organopolysiloxane elastomer derived from curing the composition as defined in claim 5.

11. A composite article comprising a substrate material and an organopolysiloxane elastomer bonded directly to a surface of said substrate material, said elastomer being the heat-cured product of the composition claimed in claim 6.

References Cited

UNITED STATES PATENTS

| | | | |
|---|---|---|---|
| 2,527,590 | 10/1950 | Speier | 260—46.5 |
| 2,907,782 | 10/1959 | Pike. | |
| 3,179,622 | 4/1965 | Haluska | 260—46.5 |
| 3,269,982 | 8/1966 | Meals | 260—46.5 |

OTHER REFERENCES

Fettes: "Chemical Reactions of Polymers," vol. XIX, High Polymers, Interscience Pub., New York (1965), pp. 955–57, 976–78.

ALLAN LIEBERMAN, *Primary Examiner.*

L. T. JACOBS, *Assistant Examiner.*

U.S. Cl. X.R.

260—46.5

PO-1050
(5/69)

UNITED STATES PATENT OFFICE
CERTIFICATE OF CORRECTION

Patent No. 3,449,289.               Dated June 10, 1969

Inventor(s) Richard L. Schank and Thomas C. Williams

It is certified that error appears in the above-identified patent and that said Letters Patent are hereby corrected as shown below:

In Table I(Columns 11 and 12) the first printed value under the heading "C" should be ---99.53---, and the second printed value under the heading "G" should be ---0.35---.

In Table II(Columns 11 and 12) cancel the term "bix" in the second line of the definition of the "Curing Agent" and insert the term ---bis---, and the fourth printed value under the heading "C" in Table II should be ---30/340---.

In line 6 of Claim 2 after the term "formula:" insert the omitted structural formula $$---R^2(Q)n---.$$

SIGNED AND
SEALED

SEP 30 1969

(SEAL)
Attest:

Edward M. Fletcher, Jr.
Attesting Officer

WILLIAM E. SCHUYLER, JR.
Commissioner of Patents